(12) United States Patent
Howarth et al.

(10) Patent No.: US 11,231,022 B2
(45) Date of Patent: Jan. 25, 2022

(54) ELECTRICAL CONNECTIONS FOR SMA ACTUATORS

(71) Applicant: CAMBRIDGE MECHATRONICS LIMITED, Cambridge (GB)

(72) Inventors: James Howarth, Cambridge (GB); Andrew Benjamin Simpson Brown, Cambridge (GB); Stephen Matthew Bunting, Cambridge (GB); Robert Langhorne, Cambridge (GB); Martin McBrien, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 12 days.

(21) Appl. No.: 16/614,076

(22) PCT Filed: May 17, 2018

(86) PCT No.: PCT/EP2018/063016
§ 371 (c)(1),
(2) Date: Nov. 15, 2019

(87) PCT Pub. No.: WO2018/211047
PCT Pub. Date: Nov. 22, 2018

(65) Prior Publication Data
US 2021/0156367 A1 May 27, 2021

(30) Foreign Application Priority Data

May 17, 2017 (GB) .................................. 1707942
Feb. 7, 2018 (GB) .................................. 1801961

(51) Int. Cl.
*F03G 7/06* (2006.01)
*H01R 4/18* (2006.01)

(52) U.S. Cl.
CPC ............. *F03G 7/065* (2013.01); *H01R 4/182* (2013.01)

(58) Field of Classification Search
CPC .. F03G 7/06; F03G 7/065; G02B 7/08; G02B 27/646; G03B 3/10; G03B 2205/0007
See application file for complete search history.

(56) References Cited

U.S. PATENT DOCUMENTS

| 8,350,959 B2* | 1/2013 | Topliss | G03B 13/34 |
| | | | 348/374 |
| 8,441,749 B2* | 5/2013 | Brown | F03G 7/065 |
| | | | 359/823 |
| 8,570,384 B2* | 10/2013 | Brown | H04N 5/23248 |
| | | | 348/208.11 |
| 9,753,300 B2* | 9/2017 | Howarth | G03B 3/10 |
| 2013/0002933 A1* | 1/2013 | Topliss | G02B 7/08 |
| | | | 348/345 |

(Continued)

FOREIGN PATENT DOCUMENTS

| CN | 202564743 | 11/2012 |
| WO | WO 2003093648 | 11/2003 |

(Continued)

*Primary Examiner* — Shafiq Mian
(74) *Attorney, Agent, or Firm* — Haley Guiliano LLP

(57) ABSTRACT

Broadly speaking, embodiments of the present techniques provide mechanisms for electrically connecting shape memory alloy (SMA) actuator wires of an actuation device to a power or current source via at least one connection element.

26 Claims, 10 Drawing Sheets

(56) References Cited

U.S. PATENT DOCUMENTS

| | | | |
|---|---|---|---|
| 2013/0222685 A1* | 8/2013 | Topliss | H04N 1/00307 |
| | | | 348/373 |
| 2015/0365568 A1* | 12/2015 | Topliss | H02K 41/0356 |
| | | | 348/360 |
| 2016/0258425 A1* | 9/2016 | Ladwig | G02B 7/023 |
| 2018/0148142 A1* | 5/2018 | Codda | B63B 43/24 |

FOREIGN PATENT DOCUMENTS

| | | | |
|---|---|---|---|
| WO | WO 2011104518 | 9/2011 | |
| WO | WO 2012020212 | 2/2012 | |
| WO | WO 2016189314 | 12/2016 | |
| WO | WO-2016189314 A1 * | 12/2016 | G03B 3/10 |

\* cited by examiner

ELECTRICAL CONNECTIONS FOR SMA ACTUATORS

CROSS-REFERENCE TO RELATED APPLICATIONS

This application is a national stage application under 35 U.S.C. § 371 of International Application PCT/EP2018/063016, filed May 17, 2018, which claim priority of GB Patent Applications 1707942.7 filed May 17, 2017, and 1801961.2, filed Feb. 7, 2018. The disclosure of which are hereby incorporated by reference herein in their entireties.

The present application generally relates to the electrical connectors for an actuator capable of enabling movement in three dimensions, and in particular to electrical connections for an actuator comprising eight shape memory alloy (SMA) actuator wires to effect movement in three dimensions.

In a first approach of the present techniques, there is provided an actuation apparatus comprising: a static component; a moveable component that is moveable relative to the static component; a plurality of shape memory alloy (SMA) actuator wires, each SMA actuator wire comprising a first portion coupled to the static component and a second portion coupled to the moveable component; a plurality of wire connectors, each wire connector for connecting the first portion of one of the plurality of SMA actuator wires to the static component; and at least one connection element arranged to individually connect the plurality of wire connectors to corresponding electrical terminals, wherein the electrical terminals are coupleable (or coupled) to a control circuit that enables selective driving of the SMA actuator wires.

In a second approach of the present techniques, there is provided an actuation apparatus comprising: a static component; a moveable component that is moveable relative to the static component; a plurality of shape memory alloy (SMA) actuator wires, each SMA actuator wire comprising a first portion coupled to the static component and a second portion coupled to the moveable component; and at least one connection element comprising at least one crimp for gripping SMA actuator wire, where the at least one connection element electrically couples together the second portion of each SMA actuator wire and is coupleable (or coupled) to a control circuit that enables selective driving of the SMA actuator wires.

In a related approach of the present techniques, there is provided an actuation apparatus comprising: a static component; a moveable component that is moveable relative to the static component; a plurality of shape memory alloy (SMA) actuator wires, each SMA actuator wire comprising a first portion coupled to the static component and a second portion coupled to the moveable component; a plurality of wire connectors, each wire connector for connecting the first portion of one of the plurality of SMA actuator wires to the static component; at least one first connection element arranged to individually connect the plurality of wire connectors to corresponding electrical terminals, wherein the electrical terminals are coupleable (or coupled) to a control circuit that enables selective driving of the SMA actuator wires; and at least one second connection element comprising at least one crimp for gripping SMA actuator wire, where the at least one connection element electrically couples together the second portion of each SMA actuator wire and is coupleable (or coupled) to the control circuit.

Preferred features are set out in the appended dependent claims. The features described herein apply equally to each approach.

Implementations of the present techniques will now be described, by way of example only, with reference to the accompanying drawings, in which.

Broadly speaking, embodiments of the present techniques provide mechanisms for electrically connecting shape memory alloy (SMA) actuator wires of an actuation device to a power or current source via at least one connection element. The connection element may be arranged to couple some crimps (used to couple the SMA actuator wires to a static or moveable component of the actuation device) to a power/current supply.

Figure 1:
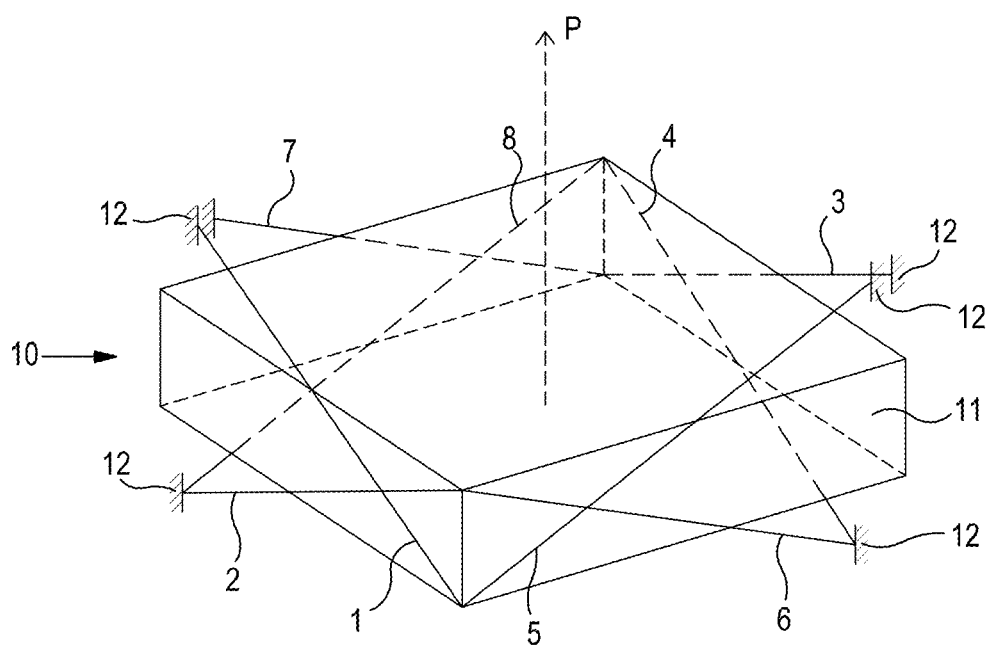
FIG. 1 is a perspective view of an example SMA-based actuation device.

FIG. 1 is a perspective view of an example shape memory alloy (SMA) based actuation device 10, described in more detail in international patent publication number WO2011/104518. The actuation device 10 comprises eight SMA actuator wires 1-8, that together may enable movement in three dimensions. The eight wires are each coupled at one end to a static component (not shown) of the actuation device 10, and coupled at the other end to a moveable component 11 of the actuation device 10. As shown in FIG. 1, the eight SMA actuator wires 1-8 may be arranged such that two wires are provided on each side of a notional square surrounding the moveable part 11, where the wires on each side may be inclined in opposite senses to a primary axis (indicated by arrow P) of the actuator. Each SMA actuator wire 1-8 may be connected at one of its ends to the static component of the actuation device 10 at an individual location 12 (and thus, there may be eight connections 12 to the static component). Each SMA actuator wire 1-8 may be fixed at the other of its ends to the moveable component 11. In FIG. 1, the connections to the moveable component 11 are at the front corner and the diagonally opposite corner, with four connections at each of these two corners. The moveable component 11 may be driven to move in three dimensions by selectively electrically heating one or more of the SMA actuator wires 1-8. The heating may cause differential contraction of the SMA actuator wires 1-8, resulting in the desired displacement/movement of the moveable component 11 relative to the primary axis P.

Figure 10:
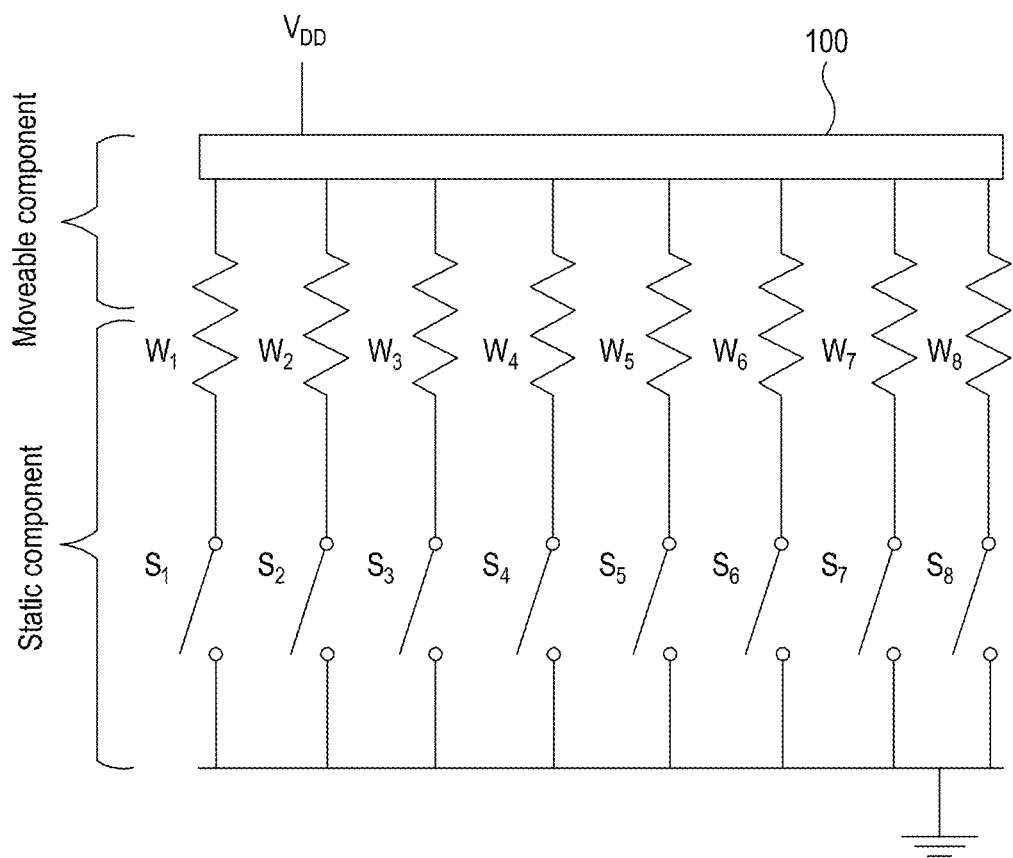
FIG. 10 shows an example circuit comprising eight SMA actuator wires and a common electrical connection.

International patent publication number WO2012/066285 describes a modified way of driving an SMA-based actuation device of the type shown in FIG. 1. WO2012/066285 describes an SMA-based actuation device in which the ends of the eight SMA actuator wires that are coupled to the moveable component are also electrically connected together, such that there is a common connection to all of the SMA actuator wires. The SMA actuator wires may then be driven sequentially via their individual connections to the static component. FIG. 10 shows an example (simplified) circuit comprising eight SMA actuator wires $W_1$ to $W_8$ that are coupled at one end to the moveable component and a common electrical connection 100, and at another end to the static component of the actuation device. Each SMA actuator wire $W_1$ to $W_8$ may be selected via a switch $S_1$ to $S_8$ and driven as required. A benefit of this arrangement is that no electrical lead is required between the moveable component and the static component of the actuation device. However, an electrical conduction path must be provided between all eight of the connections to the moveable component. This may require an extra component to be provided within the actuation device, such as a conducting ring, and may require an extra manufacturing process to fit the component and connect it to the eight SMA actuator wires.

Accordingly, the present applicant has identified a need for an improved way to electrically connect SMA actuator wires of an SMA-based actuation device to a power or current source. FIGS. 2, 3, 4A and 4B show some techniques for electrically connecting together the ends of the SMA actuator wires which are coupled to a moving component of an SMA actuator, while FIGS. 5 to 9B show some techniques for separately electrically connecting the ends of the SMA actuator wires which are coupled to a static component of an SMA actuator to a power supply or current source.

Figure 2:
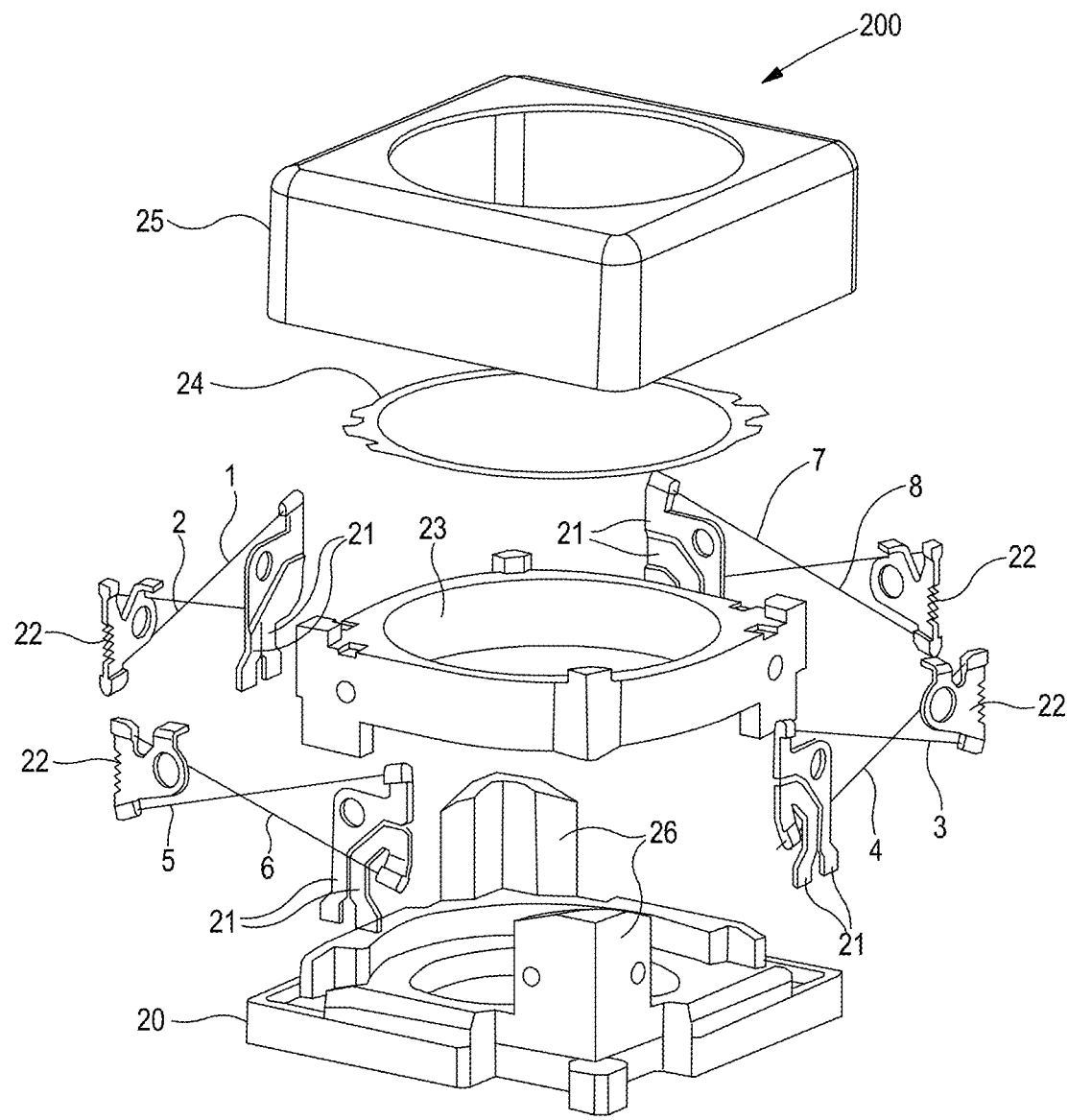
FIG. 2 shows an expanded view of an example SMA-based actuation device.

Turning to FIG. 2, this shows an expanded view of an SMA-based actuation device 200, comprising eight SMA actuator wires 1-8. The SMA-based actuation device 200 may be used to control the movement and positioning of any suitable elements, such as a lens or other optical element of a camera. It will be understood that this is merely an illustrative, non-limiting example use for the SMA-based actuation device described herein. The SMA-based actuation device 200 comprises a static component 20, a moveable component 23 and eight SMA actuator wires 1-8.

One end of each SMA actuator wire 1-8 may be coupled to the static component 20 of the actuation device 200. The static component 20 may comprise two or more pillars/supports 26 for coupling one end of each SMA actuator wire 1-8 to the static component 20. Specifically, one end of each SMA actuator wire 1-8 may be coupled to a crimp component 21, and each crimp component 21 may be fixedly coupled to the static component 20. In the embodiment shown in FIG. 2, each of the four crimp components 21 may crimp two SMA actuator wires, which may not be electrically coupled together. In embodiments where the actuation device 200 is used to move a component of a camera (e.g. a lens, lens stack, filter or other optical component), the static component may also comprise a holder or housing for an image sensor (not shown). Each of the eight crimp components 21 may be manufactured from a metal sheet (for example by shaping, etching or stamping crimp components) and a part of the each crimp component 21 may be folded or bent over an end of an SMA actuator wire to couple the SMA actuator wire to the crimp component and provide a good mechanical and electrical connection.

The other end of each SMA actuator wire 1-8 may be coupled to the moveable component 23 of the actuation device 200 in a similar manner by crimp components 22. Specifically, the other end of each SMA actuator wire 1-8 may be coupled to a crimp component 22, and each crimp component 22 may be fixedly coupled to the moveable component 23. In the embodiment shown in FIG. 2, each of the four crimp components 22 may crimp two SMA actuator wires. In embodiments where the actuation device 200 is used to move a component of a camera, the moveable component 23 may be a lens carriage which may house or hold a lens or lens stack (not shown). The lens carriage 23 may be a plastic component formed by plastic moulding. The actuation device 200 may comprise a connecting ring 24 to electrically connect the ends of the eight SMA actuator wires 1-8 that are coupled to the moveable component 23. The connecting ring 24 may be entirely formed of an electrically conductive material (such as, but not limited to, a metal), or may comprise an electrically conductive layer or electrically conductive elements disposed on a non-conductive material. In embodiments, the connecting ring 24 may be formed from sheet metal and may be coupled to the crimp components 22 by, for example, an electrically conductive adhesive or soldering to provide the required electrical connection. In embodiments where the actuation device 200 is used to move a component of a camera, the device may comprise a screening can 25, which encloses and protects the lens arrangement.

Figure 3:
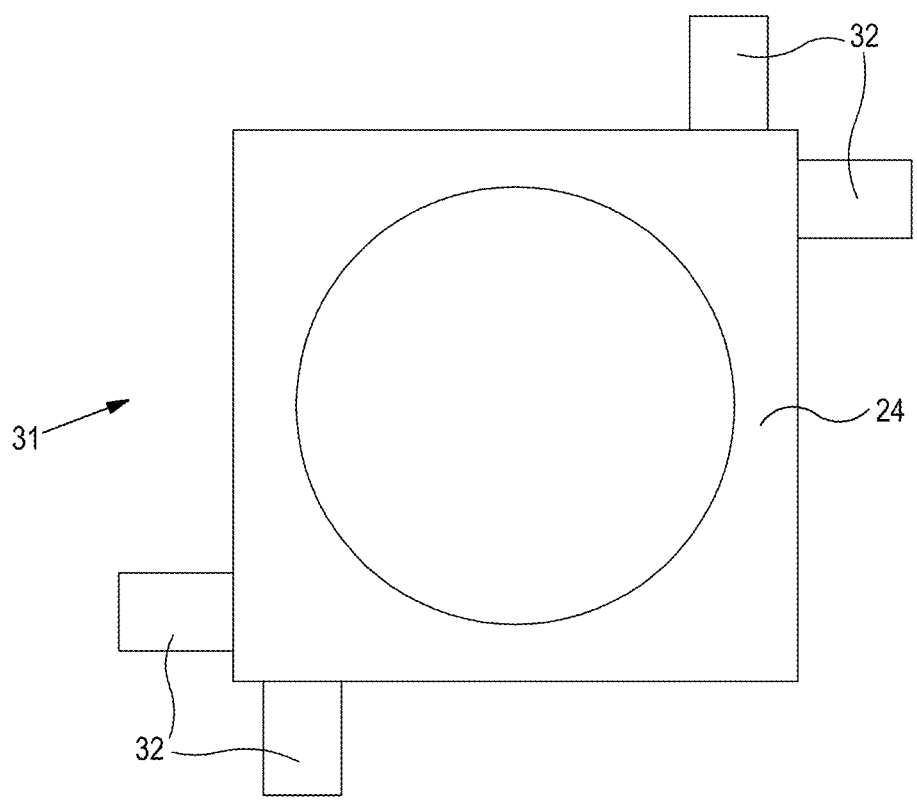
FIG. 3 shows a plan view of a connecting ring for providing a common connection to a moveable component of an SMA-based actuator.

FIG. 3 shows a plan view of a connecting ring 31 for providing a common connection to a moveable component of an SMA-based actuation device. Here, the connecting ring 31 comprises a ring portion 24 and one or more crimp components 32 for coupling ends of SMA actuator wires to the moveable component. Thus, the crimp components 32 for coupling the SMA actuator wires to the movable component may be integrally formed with the ring portion 24 as a single component. The connecting ring 31 may, in embodiments, be formed from sheet metal by stamping or otherwise. As described above, a part of each crimp component 32 may be folded or bent over an end of an SMA actuator wire to couple the SMA actuator wire to the crimp component 32 and provide a good mechanical and electrical connection. The crimp components 32 may be fixedly connected to the moveable component of an actuation device. The arrangement of FIG. 3 may be advantageous relative to the arrangement of FIG. 2 because the number of individual components is reduced, which may in turn lower the cost of manufacture or simplify the manufacturing process. Specifically, in FIG. 2 there are four separate crimp components 22 and a connecting ring 24, whereas in the arrangement shown in FIG. 3, there is a single component 31 that comprises a ring portion 24 and crimp components 32.

Figure 4A:
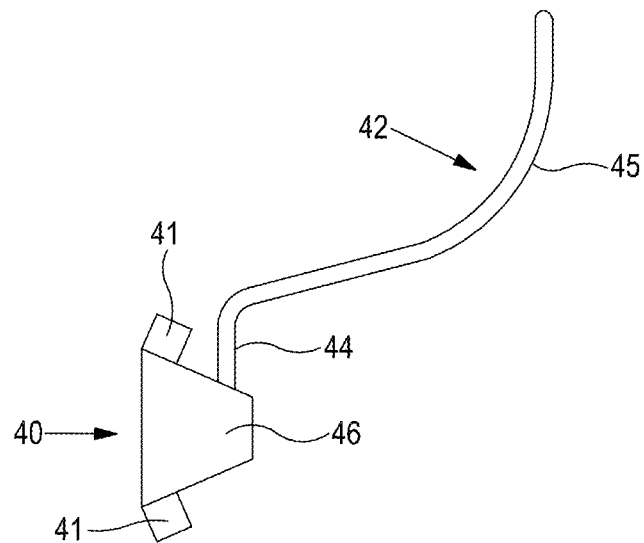
FIG. 4A shows a side view of a crimp having a common connection component.

Thus far, connecting rings have been described as means for electrically coupling together the ends of the SMA actuator wires that are coupled to the moveable component of an SMA-based actuation device. FIG. 4A shows a side view of a crimp component 40 comprising a body portion 46, an arm 42 which extends from the body portion 46, and two tabs 41 which extend from the body portion 46. The tabs 41 of each crimp component 40 which may enable the crimp component 40 to crimp/be coupled to two SMA actuator wires. The arm 42 of each crimp component 40 may be sickle-shaped as shown in FIG. 4 and may comprise a substantially straight portion 44 which is proximal to the body portion 46 and a curved portion 45 which is distal from the body portion 46. The crimp component 40 may be formed by etching or stamping sheet metal or another electrically conductive material.

Figure 4B:
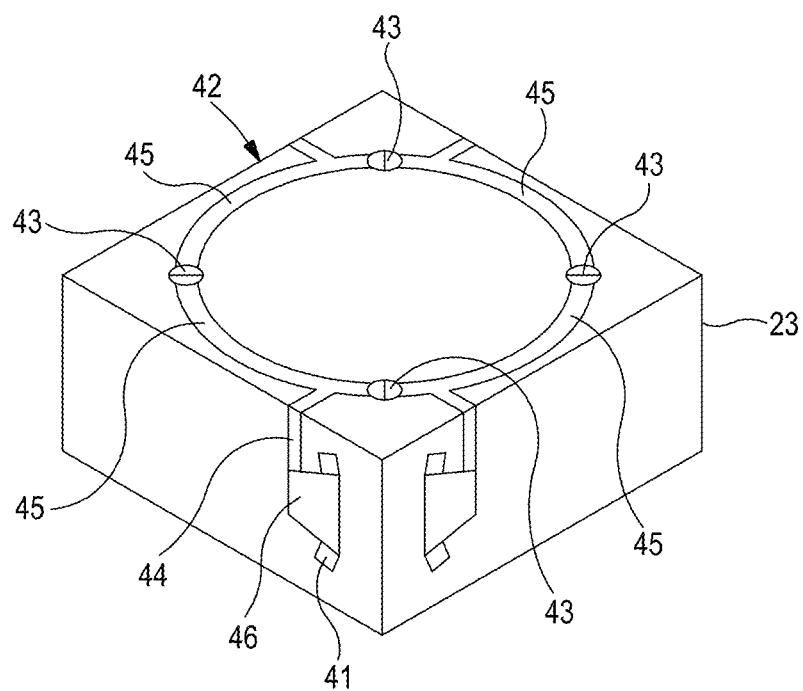
FIG. 4B shows a perspective view of an actuator comprising four crimps of the type shown in FIG. 4A.

FIG. 4B shows a perspective view of a moveable component 23 of an SMA-based actuation device comprising four crimp components 40 of the type shown in FIG. 4A.

The body portion 46 of each crimp component 40 may be coupled by any suitable technique to moveable component 23 of the SMA actuation device. Two crimp components 40 are coupled to the moveable component 23 at one corner, and a further two crimp components 40 are coupled to the moveable component 23 at a diagonally opposite corner, as shown in FIG. 4. Each crimp component 40 may be bent along the straight portion 44 such that the curved portion 45 of each of the four crimp components 40 form a ring or circle that lies in a plane. The crimp components 40 may be arranged such that, when bent/folded, the curved portions 45 are flush with a surface of the moveable component 23, or such that the curved portions 45 are separated from a surface of the moveable component 23. Adjacent curved portions 45 may meet or join together at connection points 43, and may be fixedly coupled together at the connection points 43 to form an electrical connection between all four curved portions 45, and thereby between the ends of the SMA actuator wires that are crimped by the tabs 41. The electrical coupling at the connection points 43 may be provided by an electrically conductive adhesive or by soldering.

In embodiments of the present techniques, instead of modifying a crimp component or providing a connecting ring, an electrically conductive layer or electrically conductive tracks may be provided directly on the moveable component of an SMA-based actuation device. For example, the moveable component may be partially or entirely coated with an electrically conductive layer. The moveable component may be partially or entirely metal plated, for instance. In embodiments, an electrically conductive material may only be provided as a layer on one surface of the moveable component (e.g. a top or bottom surface), or on the sides of the moveable component (e.g. the sides of the moveable component to which the crimp components are coupled). The crimp components may be electrically connected to the electrically conductive layer or tracks on the top/bottom surface or sides of the moveable component using any appropriate technique, such as by an electrically conductive adhesive or soldering. Laser direct structuring (LDS) may be used to selectively coat or plate the moveable component or to provide conductive tracks on the moveable component, for example.

In embodiments of the present techniques, the moveable component of an SMA-based actuation device may be formed of a conductive polymer (e.g. a polymer comprising electrically conductive material/particles, or an intrinsically conductive polymer). In this case, the crimp components that couple to the moveable component are automatically electrically connected together.

In embodiments of the present techniques, the moveable component of an SMA-based actuation device may be moulded (e.g. insert moulded), 3D printed or otherwise fabricated such that it comprises an integral common connection part, such as a connecting ring. This embodiment may be advantageous because the number of individual components of the actuation device is reduced, which may in turn lower the cost of manufacture or simplify the manufacturing process.

Thus, the present techniques provide an actuation apparatus comprising: a static component; a moveable component that is moveable relative to the static component; a plurality of shape memory alloy (SMA) actuator wires, each SMA actuator wire comprising a first portion coupled to the static component and a second portion coupled to the moveable component; and at least one connection element comprising at least one crimp for gripping SMA actuator wire, where the at least one connection element electrically couples together the second portion of each SMA actuator wire and is coupleable (or coupled) to a control circuit that enables selective driving of the SMA actuator wires.

The at least one connection element may be a conductive ring comprising a plurality of crimp tabs, each crimp tab having at least one crimp, wherein the second portion of each SMA actuator wire is coupled to one of crimps, and the crimps are coupled to the moveable component. The conductive ring may comprise four crimp tabs. The four crimp tabs may have two crimps each, such that one crimp tab may couple to two SMA actuator wires.

The at least one connection element may comprise a plurality of crimp components, wherein each crimp component comprises: a body portion coupleable (or coupled) to the moveable component, a connecting arm extending from the body portion, and at least one crimp tab extending from the body portion, each crimp tab having at least one crimp for coupling to the second portion of one of the plurality of SMA actuator wires, wherein the plurality of crimp components are arranged such that their connecting arms connect together.

The at least one connection element may be formed of an electrically conductive material.

Each connection element which has at least one crimp may comprise an electrically conductive layer. Each connection element which has at least one crimp may comprise a conductive metal or conductive polymer material.

In embodiments, the at least one connection element (which has at least one crimp) may be provided on the moveable component. In this case, the at least one connection element may be a plurality of electrically conductive tracks that each terminate at a crimp at one end. The plurality of electrically conductive tracks may be etched or patterned onto the moveable component using any one or more of: mechanical etching, chemical etching, laser etching, laser ablation, laser patterning, laser direct structuring, and 3D printing.

The actuation apparatus may comprise eight SMA actuator wires inclined with respect to a notional primary axis with two SMA actuator wires on each of four sides around the primary axis, the SMA actuator wires being coupled between the moveable component and the static component such that on contraction, two groups of four SMA actuator wires provide a force on the moveable component with a component of force in opposite directions along the primary axis, the SMA actuator wires of each group being arranged with two-fold rotational symmetry about the primary axis.

Each crimp of the at least one connection element (used to couple together the second portion of the SMA actuator wires) may be coupled to the moveable component by any one or more of: welding, laser welding, and an electrically conductive adhesive.

The actuation apparatus may comprise a plurality of wire connectors, each wire connector for connecting the first portion of one of the plurality of SMA actuator wires to the static component, and at least one further connection element arranged to individually connect the plurality of wire connectors to corresponding electrical terminals, wherein the electrical terminals are coupleable (or coupled) to the control circuit that enables selective driving of the SMA actuator wires. Some or all of the wire connectors may be or may comprise crimps. Each wire connector (e.g. crimp) may be coupled to the static component by any one or more of: welding, laser welding, and an electrically conductive adhesive.

Turning to FIGS. 5 to 9B, these show some techniques for separately electrically connecting the ends of the SMA actuator wires which are coupled to a static component of an SMA actuator to a power supply or current source. As described earlier with reference to FIG. 2, in embodiments of an eight-wire SMA actuation device, one end of each SMA actuator wire 1-8 may be coupled to a crimp component 21, and each crimp component 21 may be fixedly coupled to the static component 20 of the SMA actuation device. Thus, for an eight-wire actuator, there may be eight crimps, two per crimp component 21 to couple the SMA actuator wires to the static component 20. Each crimp component 21 may comprise suitable connection points (not shown in FIG. 2) on the base of each crimp 21 which are able to connect to suitable connection points or pads that are provided on the static component at the positions where the crimp components 21 are to be coupled to the static component. Thus, in embodiments, there may be two connection pads on each of the four sides of the static component 20. Alternatively, there may be eight connection pads on the static component 20 to enable each crimp of each crimp component 21 to separately connect to a connection pad. During assembly of the actuation device, the static component may be rotated round four times to form the connections between the crimp components 21 and each side of the static component.

As explained above with reference to FIG. 10, each end of each SMA actuator wire 1-8 that is coupled to the static component 20 may be separately coupled to a power supply/current source via a switch, so that each SMA actuator wire may be individually selected and driven as and when required. However, as two SMA actuator wires may be coupled to each side of the static component 20, the wiring from the SMA actuator wires to the power supply/current source may be complex, which may complicate the manufacturing or assembly process and/or may increase the cost of manufacture.

Figure 5:
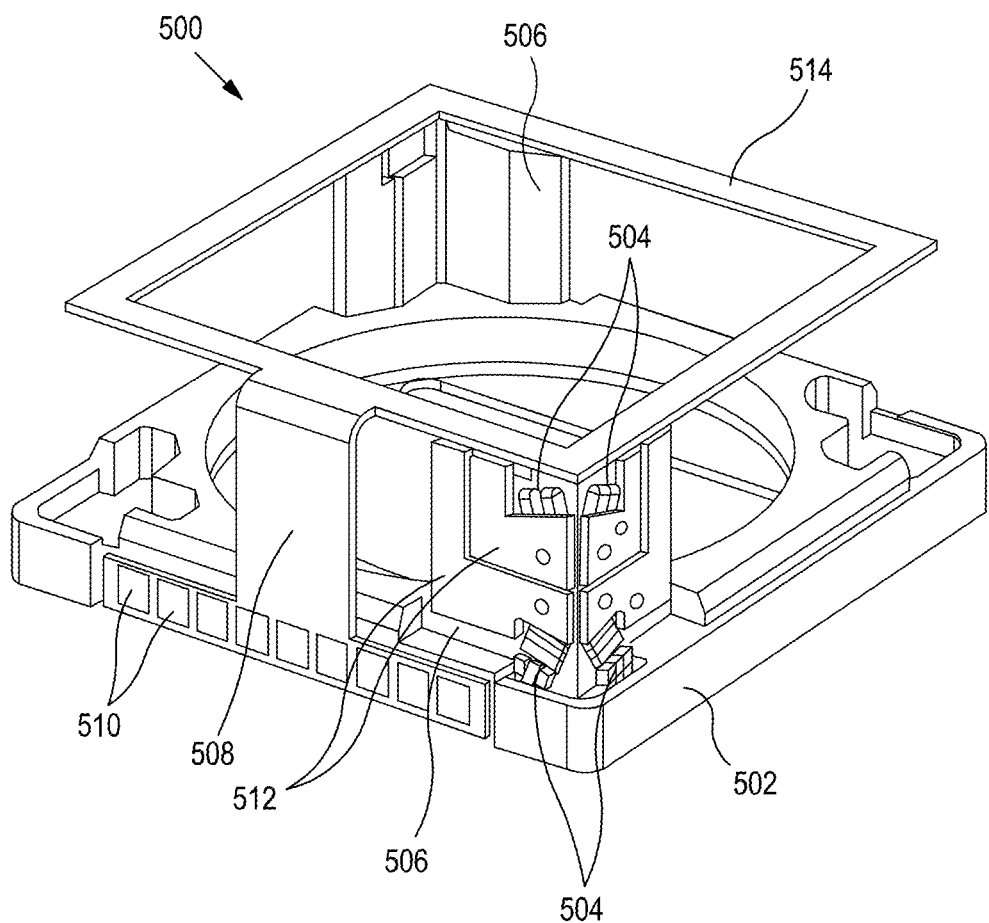
FIG. 5 shows a perspective view of a static component of an actuator comprising a flexible printed circuit (FPC) that provides a common electrical connection.

FIG. 5 shows a perspective view of a static component 500 of an SMA-based actuation device in which the electrical connections to the static crimp components are redistributed. Here, instead of having two connection points per side of the static component 500, the connection points are shifted to be on a single side of the static component 500, which may reduce the complexity of the wiring/electrical paths around the static component.

The static component 500 comprises a base portion 502, and two L-shaped pillars 506 which extend from diagonally opposite corners of the base portion 502. In embodiments, there may be four pillars, one on each side of the base portion 502. The static component 500 may comprise a plurality of crimp components 512, each crimp component comprising one or more crimps 504. In the embodiment depicted in FIG. 5, there are eight crimp components 512 that each have one crimp 504. Four crimp components 512 are provided on each L-shaped pillar 506, such that two crimp components 512 are on each side of the static component 500. It will be understood that four crimp components may be provided instead, each having two crimps, and arranged such that two crimp components are provided on each pillar 506. Electrical wiring or tracks (not shown) may run from the crimps 504 along a surface of the L-shape pillars 506 to the top of the pillars.

The static component 500 may comprise a connection element that takes the form of a connecting ring 514 for coupling the electrical wiring or tracks that extend from the crimps 504 to a flexible printed circuit (FPC) 508. The connecting ring 514 may comprise separate tracks or wires to connect to each individual electrical wire/track that extends from each crimp 504. In this way, a separate electrical connection may be made to each crimp 504. The connecting ring 514 may be provided on top of the pillars 506 as shown in FIG. 5, or may be connected to or supported by the pillars in any suitable way. The tracks/wires of the connecting ring 514 may be separately coupled to individual tracks/wires of the FPC 508.

A plurality of electrical connection pads 510 may be provided on the same side of the base portion 502 of the static component. The number of electrical connection pads 510 may be greater than or equal to the number of SMA actuator wires of the actuation device. In this example, the SMA actuation device comprises eight SMA actuator wires (not shown) and therefore, there may be at least eight connection pads 510. Additional electrical connection pads 510 may be provided for coupling the moveable component to control circuitry via the static component, or for coupling the other elements of the actuation apparatus to control circuitry or a power supply. The connection pads or terminals 510 may be coupled to a printed circuit board or other control circuit by soldering, for example. Thus, the connection between each end of the SMA actuator wire that is coupled to the static component 500 to a power supply/current source or driver circuit may be made via the electrical connection pads 510 that are conveniently provided along the same side/edge of the base portion 502 of the static component 500. The static component 500 may comprise a flexible printed circuit (FPC) 508, which may be provided such that it couples to individual tracks/wires from each crimp 504 (via the connecting ring 514) and couples each crimp 504 (and therefore, the SMA actuator wire held in the crimp) to an individual connection pad 510. This results in eight connection pads 510 on one side of the static component 500, which may make it easier to connect the SMA actuator wires to a power/current source during assembly than if there are two connection pads on each of the four sides of the static component 500 (which may require rotating the static component four times).

In the embodiment shown in FIG. 5, the static component 500 effectively comprises an electrical connection 'redistribution component', to enable the connection pads 510 to be grouped on one side of the static component 500. In FIG. 5, the redistribution component may be considered to comprise the connecting ring 514 and the FPC 508. In alternative embodiments, the redistribution component may be a component or set of components/elements that wraps around or encircles the static component 500 of the actuation device. The redistribution component in this example may be provided within or on a screening can that encases the actuation device, and in particular, encloses the static component 500, or may be the screening can itself. This arrangement may be advantageous because it may enable the overall height of the actuation device to be reduced relative to the embodiment shown in FIG. 5 where the connecting ring 514 may increase the height of the device. The screening can could be designed such that it provides (directly or indirectly) an electrical connection from each crimp 504 to a corresponding connection pad 510. In embodiments, the redistribution component may be an FPC.

Alternatively, the redistribution component may be an etched conductive (e.g. metal) component that is provided on top of or below the base portion 502 of the static component 500. The etched conductive component may be coupled to each crimp 504 and to each connection pad 510 in order for each SMA actuator wire to be selected and separately controlled.

In a further alternative embodiment, the redistribution component may comprise at least one FPC coupled to the static component 500. In embodiments, where the SMA-based actuation device is used to move a component of a camera, the redistribution component may be coupled to a sensor bracket/holder (i.e. an element which may hold or house an image sensor of the camera). Alternatively, the redistribution component may be part of the static component 500 or the sensor bracket itself instead of a separate component that is coupled to the static component/sensor bracket. The redistribution component may be an etched or stamped conductive/metal component that is insert-moulded into/onto the static component 500 or the sensor bracket. Further alternatively, the redistribution component may comprise electrically conductive tracks provided on a surface of either the static component 502 or the sensor bracket. In embodiments where the static component/sensor bracket are formed of plastic (or other non-conductive material), the tracks may be formed by etching or patterning the plastic using any suitable chemical, mechanical or laser etching/patterning technique.

Figure 6:
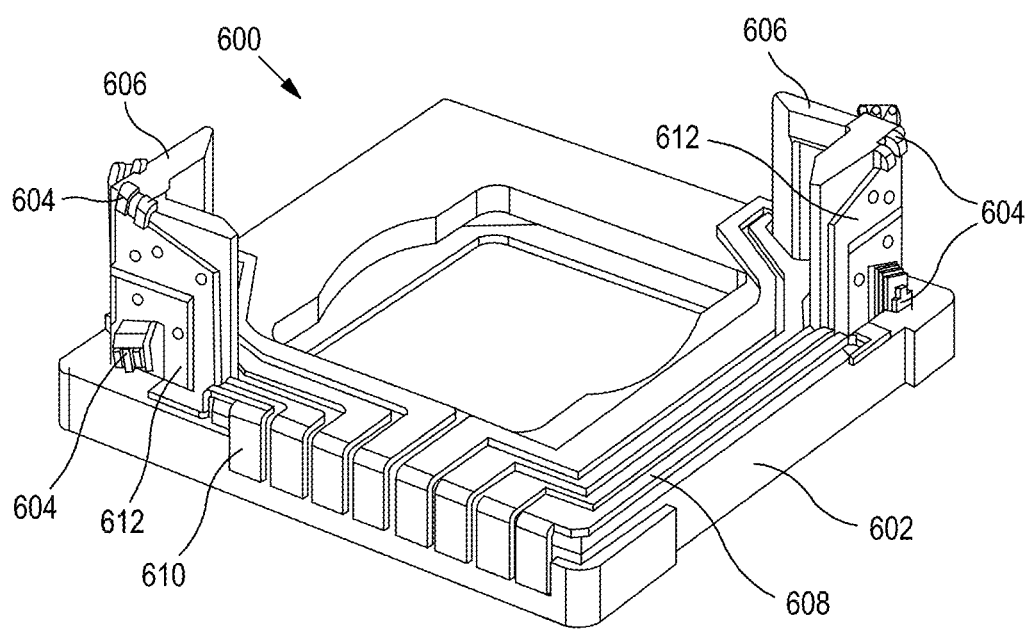
FIG. 6 shows a perspective view of a static component of an actuator comprising etched electrical tracks.

FIG. 6 shows a perspective view of a static component 600 of an SMA-based actuation device in which the electrical connections to the static crimp components are redistributed. Here, instead of having two connection points per side of the static component 600, the connection points are shifted to be on a single side of the static component 600, which may reduce the complexity of the wiring/electrical paths around the static component.

The static component 600 comprises a base portion 602, and two L-shaped pillars 606 which extend from diagonally opposite corners of the base portion 602. In embodiments, there may be four pillars, one on each side of the base portion 602. The static component 600 may comprise a plurality of crimp components 612, each crimp component comprising one or more crimps 604. In the embodiment depicted in FIG. 6, there are eight crimp components 612 that each have one crimp 604. Four crimp components 612 are provided on each L-shaped pillar 606, such that two crimp components 612 are on each side of the static component 600. It will be understood that four crimp components may be provided instead, each having two crimps, and arranged such that two crimp components are provided on each pillar 606. The static component 600 may comprise a connection element that takes the form of electrical wiring or tracks 608 that run from the crimps 604 along a surface of the base portion 602 of the static component 600. Each electrical track 608 connects to one of the crimps 604 at one end and to one of a plurality of connection points or pads 610 at another end, such that each crimp is connected to a separate connection pad 610. The static component 600 may comprise at least as many connection pads 610 as there are SMA actuator wires. As shown, all of the connection pads 610 may be provided on one side of the base portion 602 of the static component 600. The connection pads or terminals 610 may be coupled to a printed circuit board or other control circuit by soldering, for example. Having all of the connection pads 610 on one side of the static component 600 may make it easier to connect the SMA actuator wires to a power/current source during assembly, as explained above with reference to FIG. 5. The electrical tracks 608 may be formed by etching tracks (e.g. by using a chemical, mechanical or laser etching process) into the static component 600 and at least partly filling the tracks with a conductive material. Additionally or alternatively, the electrical tracks 608 may be formed by laser direct structuring (LDS).

Figure 7:
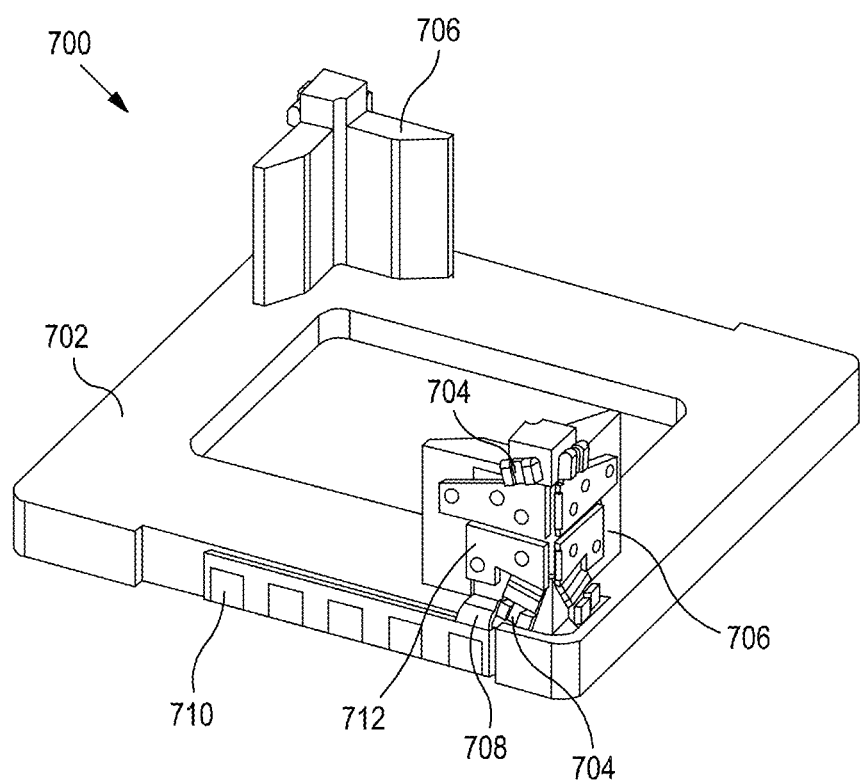
FIG. 7 shows a perspective view of a static component of an actuator comprising groups of electrical connections on one or more sides of the static component.

FIG. 7 shows a perspective view of a static component 700 of an SMA-based actuation device in which electrical connections to the static crimp components are grouped. Here, instead of having two connection points per side of the static component 700, the connection points are grouped onto two sides of the static component 700, which may reduce the complexity of the wiring/electrical paths around the static component.

The static component 700 comprises a base portion 702, and two L-shaped pillars 706 which extend from diagonally opposite corners of the base portion 702. In embodiments, there may be four pillars, one on each side of the base portion 702. The static component 700 may comprise a plurality of crimp components 712, each crimp component comprising one or more crimps 704. In the embodiment depicted in FIG. 7, there are eight crimp components 712 that each have one crimp 704. Four crimp components 712 are provided on each L-shaped pillar 706, such that two crimp components 712 are on each side of the static component 700. It will be understood that four crimp components may be provided instead, each having two crimps, and arranged such that two crimp components are provided on each pillar 506. The static component 700 may comprise a connection element that takes the form individual electrical wiring or tracks 708 that run from each crimp 704 along a surface of the L-shape pillars 706 to a corresponding connection point 710. Thus, in the embodiment depicted in FIG. 7, individual wires/tracks 708 may run from each of the four crimps 704 on one pillar 706 to a group of connection points 710 provided along one side of the base portion 702 that is adjacent to the pillar 706. Although not visible in FIG. 7, it will be understood that electrical wires/tracks may run from each of the four crimps 704 on the second pillar 706 to a second group of connection points 710 provided along one side of the base portion 702 that is adjacent to the second pillar 706.

To enable the electrical wires/tracks from all four crimps 704 on one pillar to run to the same group of connection points 710, the shape of some or all of the crimp components 712 may need to be adapted. For example, the crimp components 712 which are furthest from the group of connection points 710 in the vicinity of the pillar 706 may comprise extensions or legs that may be bent or folded around the pillar to reach the group of connection points 710. Grouping of the connection points 710 in this way (such that there at least four connection points/pads 710 on two sides of the static component 700, rather than two pads on each of four sides), may make assembly of the SMA-based actuation device considerably easier.

In summary, in the embodiment of FIG. 7, static crimp components 712 which share a pillar 706 may be arranged to couple to grouped connection points/terminals/PCB tabs 710 on a side adjacent to the pillar 706. One or more of the static crimp components 712 may be folded around the pillar 706 in order to couple to the grouped connection points 710. Connection points 710 may be grouped on two opposite or two adjacent sides of the static component 700. In alternative embodiments, at least one FPC may be folded around the outside of the pillars 706 beneath the static crimp components 712.

Figure 8:
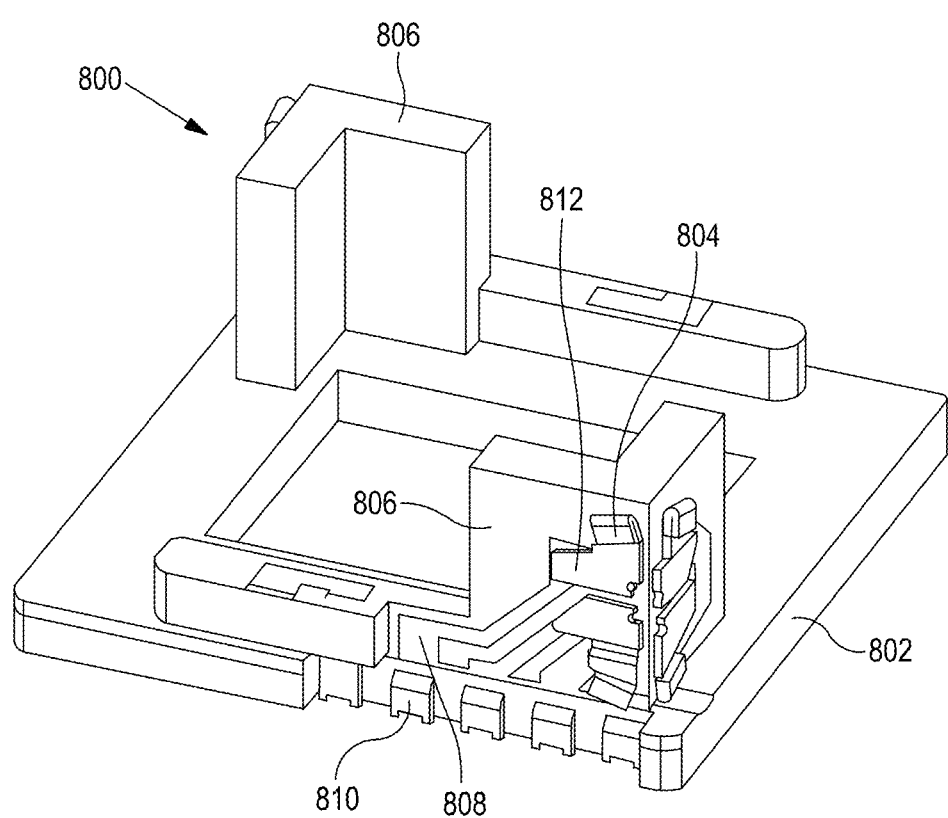
FIG. 8 shows a perspective view of a static component of an actuator comprising overmoulded electrical tracks.

FIG. 8 shows a perspective view of a static component 800 of an SMA-based actuation device in which electrical connections to the static crimp components are grouped. Here, instead of having two connection points per side of the static component 800, the connection points are grouped onto two sides of the static component 800, which may reduce the complexity of the wiring/electrical paths around the static component.

The static component 800 comprises a base portion 802, and two L-shaped pillars 806 which extend from diagonally opposite corners of the base portion 802. In embodiments, there may be four pillars, one on each side of the base portion 802. The static component 800 may comprise a plurality of crimp components 812, each crimp component comprising one or more crimps 804. In the embodiment depicted in FIG. 8, there are eight crimp components 812 that each have one crimp 804. Four crimp components 812 are provided on each L-shaped pillar 806, such that two crimp components 812 are on each side of the static component 800. It will be understood that four crimp components may be provided instead, each having two crimps, and arranged such that two crimp components are provided on each pillar 806. The static component 800 may comprise a connection element that takes the form individual electrical wiring or tracks 808 that run from each crimp 804 along a surface of the L-shape pillars 806 to a corresponding connection point 810. Thus, in the embodiment depicted in FIG. 8, individual wires/tracks 808 may run from each of the four crimps 804 on one pillar 806 to a group of connection points 810 provided along one side of the base portion 802 that is adjacent to the pillar 806. Although not visible in FIG. 8, it will be understood that electrical wires/tracks may run from each of the four crimps 804 on the second pillar 806 to a second group of connection points 810 provided along one side of the base portion 802 that is adjacent to the second pillar 806.

In this embodiment, the electrical wires/tracks 808 may be stamped or etched tracks that are over-moulded onto the static component 800. The tracks may be exposed at certain points to allow electrical coupling to the static crimps 804 and the connection points/pads 810. Grouping of the connection points 810 in this way (such that there at least four connection points/pads 810 on two sides of the static component 800, rather than two pads on each of four sides), may make assembly of the SMA-based actuation device considerably easier.

Figure 9:
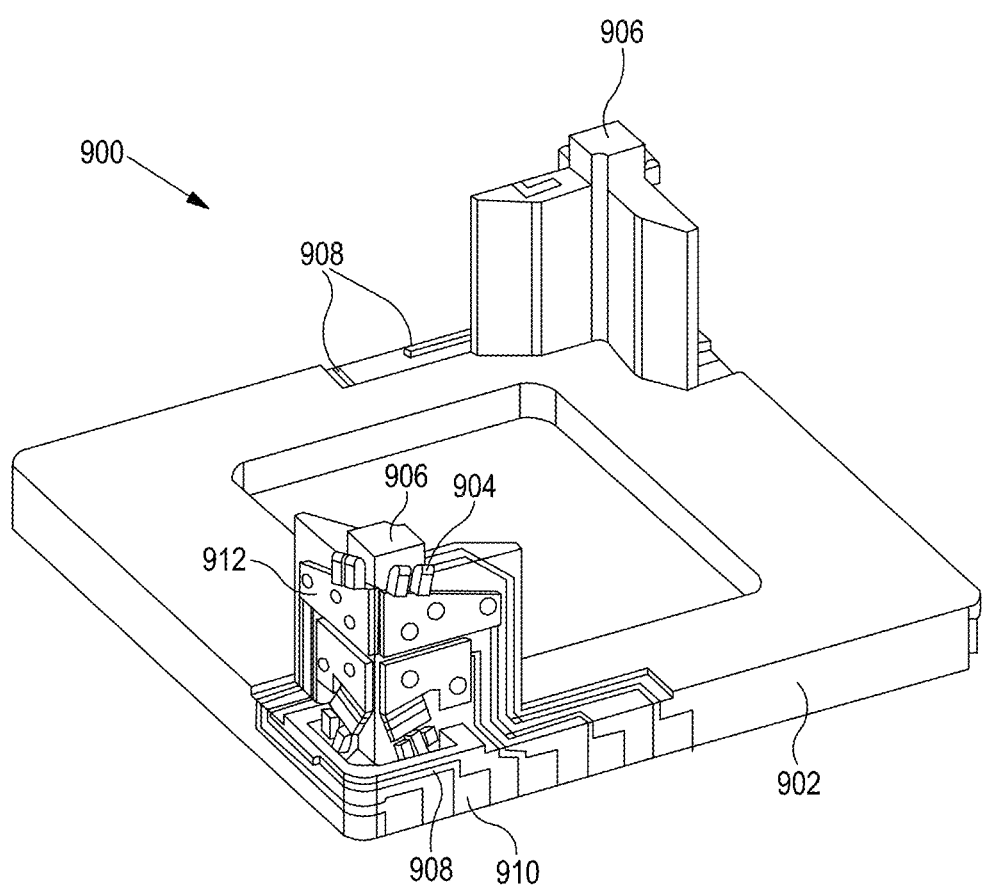
FIG. 9 shows a perspective view of a static component of an actuator comprising injection-moulded electrical tracks.

FIG. 9 shows a perspective view of a static component 900 of an SMA-based actuation device in which electrical connections to the static crimp components are grouped. Here, instead of having two connection points per side of the static component 900, the connection points are grouped onto two sides of the static component 900, which may reduce the complexity of the wiring/electrical paths around the static component.

The static component 900 comprises a base portion 902, and two L-shaped pillars 906 which extend from diagonally opposite corners of the base portion 902. In embodiments, there may be four pillars, one on each side of the base portion 902. The static component 900 may comprise a plurality of crimp components 912, each crimp component comprising one or more crimps 904. In the embodiment depicted in FIG. 9, there are eight crimp components 912 that each have one crimp 904. Four crimp components 912 are provided on each L-shaped pillar 906, such that two crimp components 912 are on each side of the static component 900. It will be understood that four crimp components may be provided instead, each having two crimps, and arranged such that two crimp components are provided on each pillar 906. The static component 900 may comprise a connection element that takes the form individual electrical wiring or tracks 908 that run from each crimp 904 along a surface of the L-shape pillars 906 to a corresponding connection point 910. Thus, in the embodiment depicted in FIG. 9, individual wires/tracks 908 may run from each of the four crimps 904 on one pillar 906 to a group of connection points 910 provided along one side of the base portion 902 that is adjacent to the pillar 906. Although not visible in FIG. 9, it will be understood that electrical wires/tracks may run from each of the four crimps 904 on the second pillar 906 to a second group of connection points 910 provided along one side of the base portion 902 that is adjacent to the second pillar 906.

In this embodiment, the static component 900 may be injection-moulded and the electrical tracks 908 may be formed during this process. The injection-moulded tracks may be at least partly filled with an electrically conductive material, and may be arranged such that they each electrically couple together one static crimp 904 and one connection point/pad 910. Grouping of the connection points 910 in this way (such that there at least four connection points/pads 910 on two sides of the static component 900, rather than two pads on each of four sides), may make assembly of the SMA-based actuation device considerably easier.

In each of the embodiments described above, the crimp(s) of each crimp component may be coupled using any suitable technique to an electrode or electrical wiring/track that connects the crimp (and SMA actuator wire therein) to a connection point/terminal. For example, the crimps may be adhered to the electrodes or electrical tracks using an electrically conductive adhesive material. Additionally or alternatively, the crimps may be coupled to the electrodes or electrical tracks using welding, soldering or laser welding. It will be understood that the crimps may be electrically coupled to one of the redistribution components described above using a conductive adhesive, soldering or laser welding. Laser welding may also be used to couple the crimps to an electrode or electrical track when electric connection redistribution is not employed within an SMA actuation device.

With respect to the embodiments described with reference to FIGS. 5 to 9, the crimps may be connected to the connection terminals/pads via a metal component that may be insert moulded into the static component or glued/adhered to a surface of the static component. Alternatively, instead of being on the static component itself (as shown in each of FIGS. 5 to 9), the connection terminals/pads may be provided on an FPC or on a redistribution component.

Thus, the present techniques provide an actuation apparatus which may comprise: a static component; a moveable component that is moveable relative to the static component; a plurality of shape memory alloy (SMA) actuator wires, each SMA actuator wire comprising a first portion coupled to the static component and a second portion coupled to the moveable component; a plurality of wire connectors, each wire connector for connecting the first portion of one of the plurality of SMA actuator wires to the static component; and at least one connection element arranged to individually connect the plurality of wire connectors to corresponding electrical terminals, wherein the electrical terminals are coupleable (or coupled) to a control circuit that enables selective driving of the SMA actuator wires.

The number of electrical terminals may be at least equal to the number of SMA actuator wires.

The electrical terminals may be provided on the static component. In embodiments, the electrical terminals may be provided on one side of the static component. Alternatively, the electrical terminals may be provided on more than one side of the static component. The actuation apparatus may comprise eight SMA actuator wires, and at least eight electrical terminals may be provided on one side of the static component. In this case, the electrical terminals may be grouped into a first group and a second group, where the first group may be provided on a first side of the static component, and the second group may be provided on a second side of the static component. The first side may be adjacent to the second side. Alternatively, the first side may be non-adjacent to the second side.

In embodiments, the actuation apparatus may comprise eight SMA actuator wires, and wherein the first group may comprise four electrical terminals and the second group may comprise at least four electrical terminals.

The electrical terminals may be grouped into a first group, a second group, a third group, and a fourth group, provided on a first side, a second side, a third side and a fourth side of the static component respectively. In embodiments, the actuation apparatus may comprise eight SMA actuator wires, where each of the first, second, third and fourth group may comprise at least two electrical terminals.

In embodiments, the electrical terminals may be provided on a further component. For example, the further component may be or comprise a flexible printed circuit board. In another example, the further component may be a screening can that at least partly encases the actuation apparatus.

The at least one connection element may be or may comprise a flexible printed circuit board.

The at least one connection element may comprise electrically conductive tracks on the static component. The electrically conductive tracks may be etched or patterned onto the static component using any one or more of: mechanical etching, chemical etching, laser etching, laser ablation, laser patterning, laser direct structuring, and 3D printing.

The actuation apparatus may comprise at least one further connection element, each further connection element comprising at least one crimp for gripping SMA actuator wire, where the at least one further connection element electrically couples together the second portion of each SMA actuator wire and is coupleable (or coupled) to the control circuit that enables selective driving of the SMA actuator wires. The further connection element is described above with reference to FIGS. 3, 4A and 4B. Each crimp of the further connection element may be coupled to the moveable component by any one or more of: welding, laser welding, and an electrically conductive adhesive.

The actuation apparatus may comprise eight SMA actuator wires inclined with respect to a notional primary axis with two SMA actuator wires on each of four sides around the primary axis, the SMA actuator wires being coupled between the moveable component and the static component such that on contraction, two groups of four SMA actuator wires provide a force on the moveable component with a component of force in opposite directions along the primary axis, the SMA actuator wires of each group being arranged with two-fold rotational symmetry about the primary axis.

Each wire connector may be a crimp for making a good mechanical and electrical connection to an SMA actuator wire. The wire connector may be formed of an electrically conductive material. Each wire connector (e.g. crimp) may be coupled to the static component by any one or more of: welding, laser welding, and an electrically conductive adhesive.

Further embodiments of the present techniques are set out in the following numbered clauses:

1. An SMA actuator comprising: a support structure; a movable element supported on the support structure in a manner allowing movement of the movable element relative to the support structure; and eight SMA actuator wires inclined with respect to a notional primary axis with two SMA actuator wires on each of four sides around the primary axis, the SMA actuator wires being connected between the movable element and the support structure so that on contraction, two groups of four SMA actuator wires provide a force on the movable element with a component in opposite directions along the primary axis, the SMA actuator wires of each group being arranged with 2-fold rotational symmetry about the primary axis; wherein the connections of the SMA actuator wires to the movable element are electrically connected together through a connecting element.
2. The SMA actuator of clause 1 wherein the connecting element is a metal ring.
3. The SMA actuator of clause 1 wherein crimp components hold the ends of the SMA wires and the connecting element is integrally formed with the crimp components.
4. The SMA actuator of clause 1 wherein crimp components hold the ends of the SMA wires and the connecting element is formed by connecting together extensions of the crimp components.
5. The SMA actuator of clause 1 wherein the connecting element is a conductive layer on the surface of the movable element.
6. The SMA actuator of clause 4 wherein the movable element is selectively coated with a conductive layer.
7. The SMA actuator of clause 4 wherein laser direct structuring is used to selectively coat the movable element.
8. The SMA actuator of clause 1 wherein the movable element is made of conductive polymer and thereby acts as the connecting element.
9. The SMA actuator of clause 1 wherein the connecting element is insert moulded into the movable element during moulding of said movable element.
10. An SMA actuator comprising: a support structure; a movable element supported on the support structure in a manner allowing movement of the movable element relative to the support structure; and eight SMA actuator wires inclined with respect to a notional primary axis with two SMA actuator wires on each of four sides around the primary axis, the SMA actuator wires being connected between the movable element and the support structure so that on contraction, two groups of four SMA actuator wires provide a force on the movable element with a component in opposite directions along the primary axis, the SMA actuator wires of each group being arranged with 2-fold rotational symmetry about the primary axis; wherein the connections of the SMA actuator wires to the support structure are made through crimps and each crimp is connected to a respective pad on the support structure such that there are eight pads on the support structure.
11. The SMA actuator of clause 10 wherein there are two pads on each of four sides of the support structure.
12. The SMA actuator of clause 10 wherein the eight pads on the support structure are all on the same side of the support structure.
13. The SMA actuator of clause 12 wherein the connections from the crimps to the pads are made via tracks on a printed flexible circuit.
14. The SMA actuator of clause 12 wherein the connections from the crimps to the pads are made by laser direct structuring.
15. The SMA actuator of clause 10 wherein there are four pads on each of two sides of the support structure.
16. The SMA actuator of preceding clauses used in a miniature camera.
17. The SMA actuator of clause 16 used to effect autofocus and/or optical image stabilization.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An actuation apparatus comprising:
a static component;
a moveable component that is moveable relative to the static component;
a plurality of shape memory alloy (SMA) actuator wires, each SMA actuator wire comprising a first portion coupled to the static component and a second portion coupled to the moveable component;
a plurality of wire connectors, each wire connector for connecting the first portion of one of the plurality of SMA actuator wires to the static component; and
at least one connection element arranged to individually connect the plurality of wire connectors to corresponding electrical terminals, wherein the electrical terminals are coupleable to a control circuit that enables selective driving of the SMA actuator wires,
wherein the electrical terminals are grouped into a first group and a second group, where the first group is provided on a first side of the static component, and the second group is provided on a second side of the static component.

2. The actuation apparatus as claimed in claim 1, wherein the plurality of SMA actuator wires comprises eight SMA actuator wires, and at least eight electrical terminals are provided on one side of the static component.

3. The actuation apparatus as claimed in claim 1, wherein the plurality of SMA actuator wires comprises eight SMA actuator wires, wherein the electrical terminals are grouped into a first group, a second group, a third group, and a fourth group, provided on a first side, a second side, a third side and a fourth side of the static component respectively, and wherein each of the first, second, third and fourth group comprises at least two electrical terminals.

4. The actuation apparatus as claimed in claim 1, wherein the electrical terminals are provided on a further component.

5. The actuation apparatus as claimed in claim 4, wherein the further component comprises a flexible printed circuit board.

6. The actuation apparatus as claimed in claim 4, wherein the further component is a screening can that at least partly encases the actuation apparatus.

7. The actuation apparatus as claimed in claim 1, wherein the at least one connection element comprises a flexible printed circuit board.

8. The actuation apparatus as claimed in claim 1, wherein the at least one connection element comprises electrically conductive tracks on the static component.

9. The actuation apparatus as claimed in claim 8, wherein the electrically conductive tracks are etched or patterned onto the static component using any one or more of: mechanical etching, chemical etching, laser etching, laser ablation, laser patterning, laser direct structuring, and 3D printing.

10. The actuation apparatus as claimed in claim 1, further comprising at least one further connection element, each further connection element comprising at least one crimp for gripping SMA actuator wire, where the at least one further connection element electrically couples together the second portion of each SMA actuator wire and is coupleable to the control circuit that enables selective driving of the SMA actuator wires.

11. The actuation apparatus as claimed in claim 10, wherein each crimp of the further connection element is coupled to the moveable component by any one or more of: welding, laser welding, and an electrically conductive adhesive.

12. The actuation apparatus as claimed in claim 1, wherein the plurality of SMA actuator wires comprises eight SMA actuator wires inclined with respect to a notional primary axis with two SMA actuator wires on each of four sides around the primary axis, the SMA actuator wires being coupled between the moveable component and the static component such that on contraction, two groups of four SMA actuator wires provide a force on the moveable component with a component of force in opposite directions along the primary axis, the SMA actuator wires of each group being arranged with two-fold rotational symmetry about the primary axis.

13. The actuation apparatus as claimed in claim 1, wherein the plurality of wire connectors are crimps.

14. The actuation apparatus as claimed in claim 1, wherein the plurality of wire connectors are formed of an electrically conductive material.

15. The actuation apparatus as claimed in claim 1, wherein each wire connector is coupled to the static component by any one or more of: welding, laser welding, and an electrically conductive adhesive.

16. An actuation apparatus comprising:
a static component;
a moveable component that is moveable relative to the static component;
a plurality of shape memory alloy (SMA) actuator wires, each SMA actuator wire comprising a first portion coupled to the static component and a second portion coupled to the moveable component; and
at least one connection element comprising at least one crimp for gripping SMA actuator wire, where the at least one connection element electrically couples together the second portion of each SMA actuator wire and is coupleable to a control circuit that enables selective driving of the SMA actuator wires,
wherein the at least one connection element is a conductive ring comprising four crimp tabs, each crimp tab having two crimps each, wherein the second portion of each SMA actuator wire is coupled to one of crimps, and the crimps are coupled to the moveable component.

17. An actuation apparatus comprising:
a static component;
a moveable component that is moveable relative to the static component;
a plurality of shape memory alloy (SMA) actuator wires, each SMA actuator wire comprising a first portion coupled to the static component and a second portion coupled to the moveable component; and
at least one connection element comprising at least one crimp for gripping SMA actuator wire, where the at least one connection element electrically couples together the second portion of each SMA actuator wire and is coupleable to a control circuit that enables selective driving of the SMA actuator wires,
wherein the at least one connection element comprises a plurality of crimp components, wherein each crimp component comprises:
a body portion coupleable to the moveable component,
a connecting arm extending from the body portion, and at least one crimp tab extending from the body portion, each crimp tab having at least one crimp for coupling to the second portion of one of the plurality of SMA actuator wires, wherein the plurality of crimp components are arranged such that their connecting arms connect together.

18. The actuation apparatus as claimed in claim 16, wherein the at least one connection element comprises an electrically conductive layer.

19. The actuation apparatus as claimed in claim 16, wherein the at least one connection element is provided on the moveable component.

20. The actuation apparatus as claimed in claim 19, wherein the at least one connection element on the moveable component is a plurality of electrically conductive tracks that each terminate at a crimp at one end.

21. The actuation apparatus as claimed in claim 20, wherein the plurality of electrically conductive tracks are etched or patterned onto the moveable component using any one or more of: mechanical etching, chemical etching, laser etching, laser ablation, laser patterning, laser direct structuring, and 3D printing.

22. The actuation apparatus as claimed in claim 16, wherein the plurality of SMA actuator wires comprises eight SMA actuator wires inclined with respect to a notional primary axis with two SMA actuator wires on each of four sides around the primary axis, the SMA actuator wires being coupled between the moveable component and the static component such that on contraction, two groups of four SMA actuator wires provide a force on the moveable component with a component of force in opposite directions along the primary axis, the SMA actuator wires of each group being arranged with two-fold rotational symmetry about the primary axis.

23. The actuation apparatus as claimed in claim 16, wherein each crimp of the at least one connection element is coupled to the moveable component by any one or more of: welding, laser welding, and an electrically conductive adhesive.

24. The actuation apparatus as claimed in claim 16, further comprising:
a plurality of wire connectors, each wire connector for connecting the first portion of one of the plurality of SMA actuator wires to the static component; and
at least one further connection element arranged to individually connect the plurality of wire connectors to corresponding electrical terminals, wherein the electrical terminals are coupleable to the control circuit that enables selective driving of the SMA actuator wires.

25. The actuation apparatus as claimed in claim 24, wherein the plurality of wire connectors are crimps and wherein each wire connector is coupled to the static component by any one or more of: welding, laser welding, and an electrically conductive adhesive.

26. An actuation apparatus comprising:
a static component;
a moveable component that is moveable relative to the static component;
a plurality of shape memory alloy (SMA) actuator wires, each SMA actuator wire comprising a first portion coupled to the static component and a second portion coupled to the moveable component;
a plurality of wire connectors, each wire connector for connecting the first portion of one of the plurality of SMA actuator wires to the static component; and
at least one connection element arranged to individually connect the plurality of wire connectors to corresponding electrical terminals, wherein the electrical terminals are coupleable to a control circuit that enables selective driving of the SMA actuator wires,
wherein the plurality of SMA actuator wires comprises eight SMA actuator wires, wherein the electrical terminals are grouped into a first group, a second group, a third group, and a fourth group, provided on a first side, a second side, a third side and a fourth side of the static component respectively, and wherein each of the first, second, third and fourth group comprises at least two electrical terminals.

* * * * *